US012062860B2

(12) United States Patent
Yang et al.

(10) Patent No.: US 12,062,860 B2
(45) Date of Patent: Aug. 13, 2024

(54) ANTENNA SYSTEM

(71) Applicant: Wistron NeWeb Corp., Hsinchu (TW)

(72) Inventors: Wei-Tung Yang, Hsinchu (TW); Tsun-Che Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 157 days.

(21) Appl. No.: 17/818,063

(22) Filed: Aug. 8, 2022

(65) Prior Publication Data

US 2023/0223689 A1 Jul. 13, 2023

(30) Foreign Application Priority Data

Jan. 11, 2022 (TW) ................................ 111101063

(51) Int. Cl.

*H01Q 5/307* (2015.01)
*H01Q 1/48* (2006.01)
*H01Q 9/42* (2006.01)

(52) U.S. Cl.

CPC ............... *H01Q 5/307* (2015.01); *H01Q 1/48* (2013.01); *H01Q 9/42* (2013.01)

(58) Field of Classification Search

None

See application file for complete search history.

(56) References Cited

U.S. PATENT DOCUMENTS

| | | | | |
|---|---|---|---|---|
| 10,797,379 | B1 * | 10/2020 | Lee ........................ | H01Q 5/378 |
| 2012/0001815 | A1 | 1/2012 | Wong et al. | |
| 2022/0336948 | A1 * | 10/2022 | Chang ...................... | H01Q 9/42 |

* cited by examiner

*Primary Examiner* — Jany Richardson

(74) *Attorney, Agent, or Firm* — McClure, Qualey & Rodack, LLP

(57) ABSTRACT

An antenna system includes a dielectric substrate, a ground element, and a first antenna element. The dielectric substrate has a first surface and a second surface, which are opposite to each other. The ground element is disposed on the first surface of the dielectric substrate. The first antenna element includes a first radiation element, a feeding radiation element, a second radiation element, and a shorting radiation element. The first radiation element has a feeding point, and is disposed on the second surface of the dielectric substrate. The feeding radiation element is adjacent to the first radiation element. The second radiation element is coupled to the feeding radiation element. The second radiation element is further coupled through the shorting radiation element to the ground element.

19 Claims, 5 Drawing Sheets

ANTENNA SYSTEM

CROSS REFERENCE TO RELATED APPLICATIONS

This application claims priority of Taiwan Patent Application No. 111101063 filed on Jan. 11, 2022, the entirety of which is incorporated by reference herein.

BACKGROUND OF THE INVENTION

Field of the Invention

The disclosure generally relates to an antenna system, and more particularly, to an antenna system for improving ECC (Envelope Correlation Coefficient).

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements of a device supporting wireless communication. However, because of the small amount of internal space in the communication device, the arrangements of the antennas are often very close, and they are likely to interfere with each other. Accordingly, it is necessary to propose a novel solution for solving the problem of too high an ECC (Envelope Correlation Coefficient) in a conventional antenna system.

BRIEF SUMMARY OF THE INVENTION

In an exemplary embodiment, the invention is directed to an antenna system that includes a dielectric substrate, a ground element, and a first antenna element. The dielectric substrate has a first surface and a second surface, which are opposite to each other. The ground element is disposed on the first surface of the dielectric substrate. The first antenna element includes a first radiation element, a feeding radiation element, a second radiation element, and a shorting radiation element. The first radiation element has a feeding point, and is disposed on the second surface of the dielectric substrate. The feeding radiation element is adjacent to the first radiation element. The second radiation element is coupled to the feeding radiation element. The second radiation element is further coupled through the shorting radiation element to the ground element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
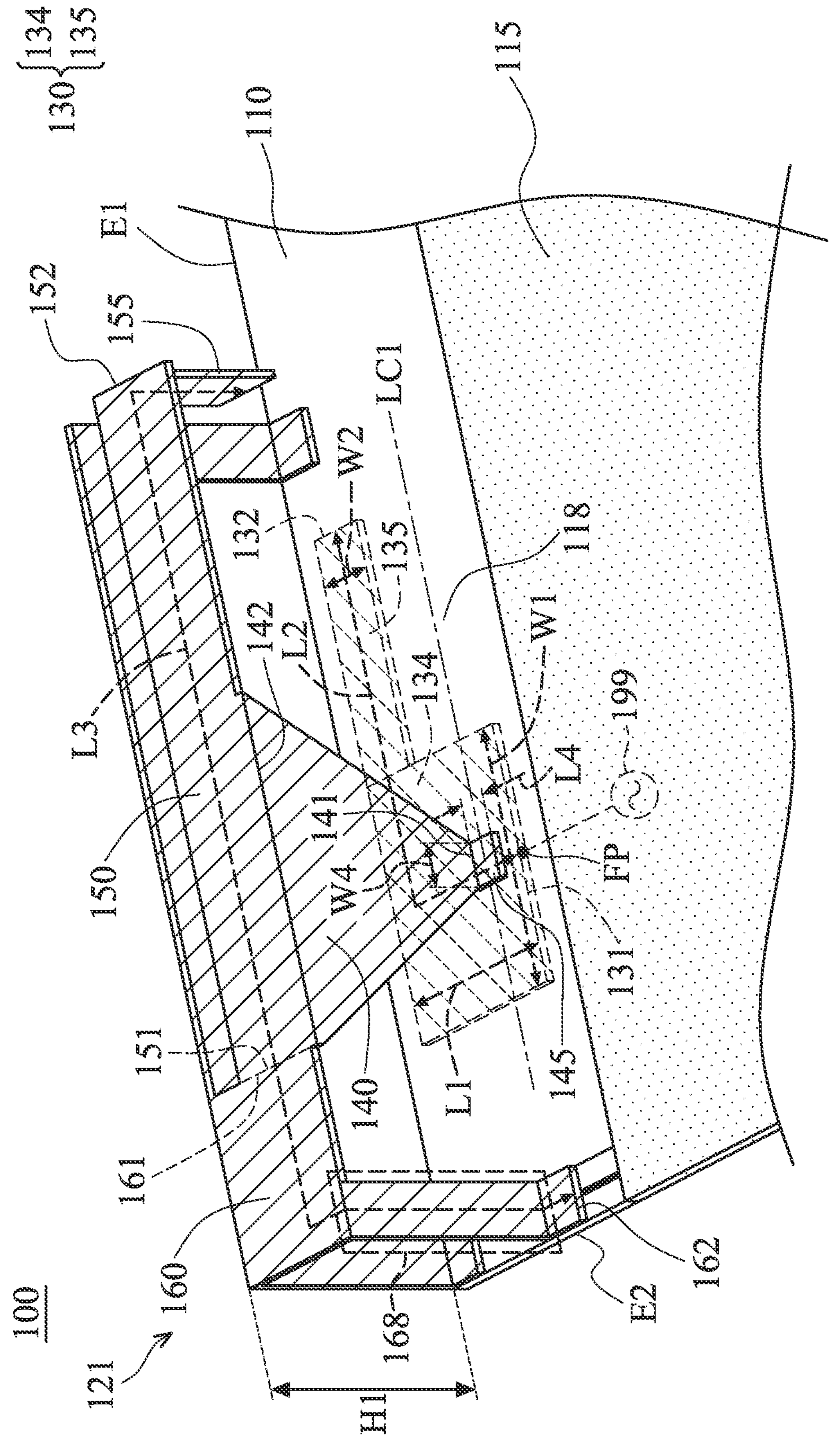
FIG. 1A is a front view of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
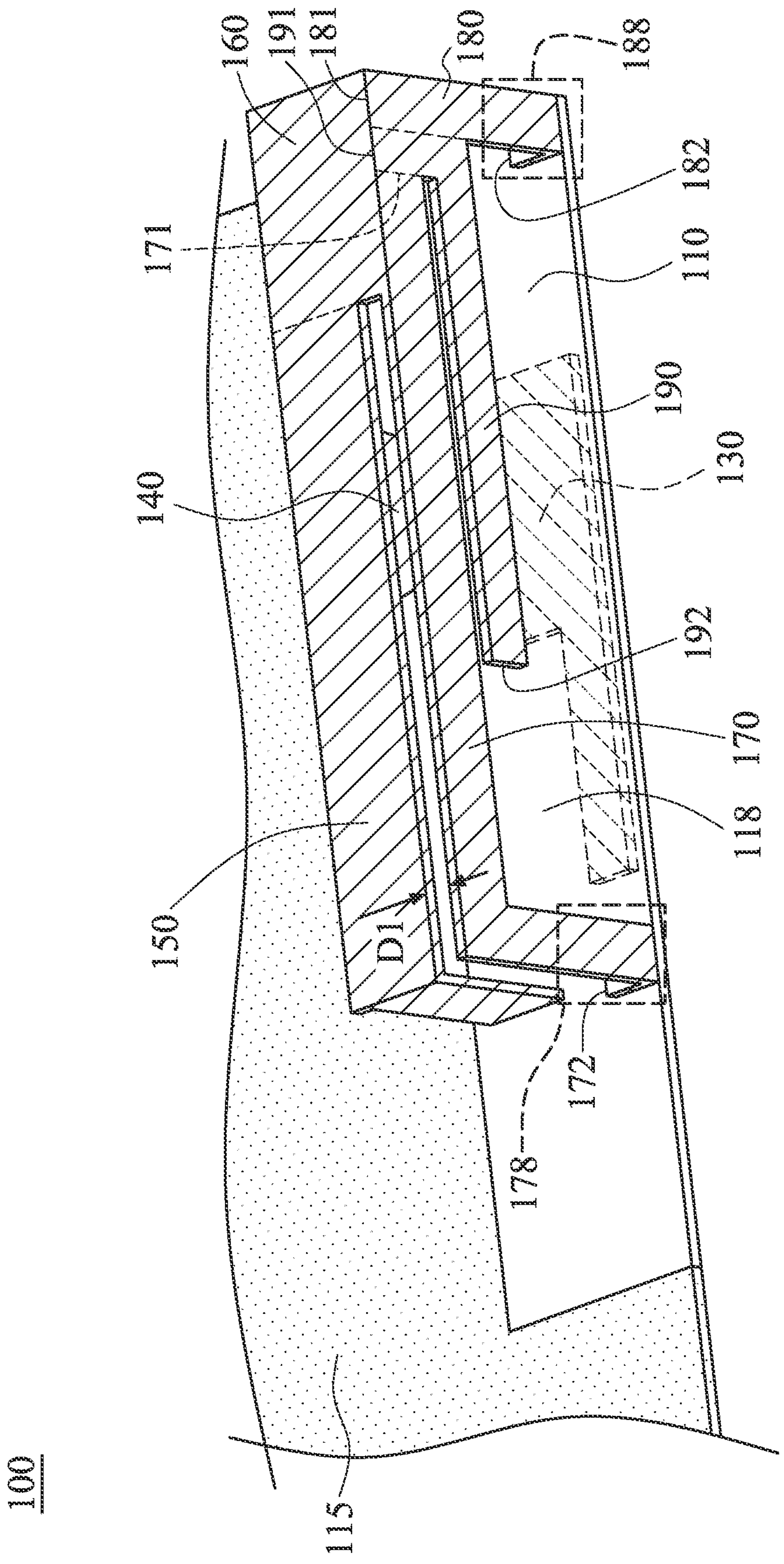
FIG. 1B is a back view of an antenna system according to an embodiment of the invention.
Figure 1C:
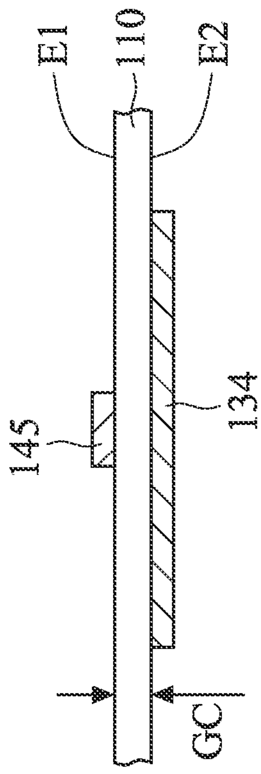
FIG. 1C is a partial sectional view of an antenna system according to an embodiment of the invention.

FIG. 1A is a front view of an antenna system 100 according to an embodiment of the invention. FIG. 1B is a back view of the antenna system 100 according to an embodiment of the invention. FIG. 1C is a partial sectional view of the antenna system 100 according to an embodiment of the invention (along a sectional line LC1 of FIG. 1A).

Please refer to FIG. 1A, FIG. 1B and FIG. 1C together. For example, the antenna system 100 may be applied to a wireless access point, but it is not limited thereto. In alternative embodiments, the antenna system 100 may be applied to a mobile device, such as a smart phone, a tablet computer, or a notebook computer.

In the embodiment of FIG. 1A, FIG. 1B and FIG. 1C, the antenna system 100 at least includes a dielectric substrate 110, a ground element 115, and a first antenna element 121. The first antenna element 121 at least includes a first radiation element 130, a feeding radiation element 140, a second radiation element 150, and a shorting radiation element 160. The ground element 115, the first radiation element 130, the feeding radiation element 140, the second radiation element 150, and the shorting radiation element 160 may all be made of metal materials, such as copper, silver, aluminum, iron, or their alloys.

The dielectric substrate 110 may be an FR4 (Flame Retardant 4) substrate or a PCB (Printed Circuit Board). The dielectric substrate 110 has a first surface E1 and a second surface E2, which are opposite to each other. The ground element 115 is disposed on the first surface E1 of the dielectric substrate 110. The first radiation element 130 is disposed on the second surface E2 of the dielectric substrate 110. The ground element 115 may be a system ground plane of the antenna system 100, and its shape is not limited in the invention. In some embodiments, the first surface E1 of the dielectric substrate 110 has a clearance region 118, which excludes the ground element 115 and accommodates the first antenna element 121.

The first radiation element 130 may substantially have an L-shape. Specifically, the first radiation element 130 has a first end 131 and a second end 132. A feeding point FP is positioned at the first end 131 of the first radiation element 130. The second end 132 of the first radiation element 130 is an open end. The feeding point FP is further coupled to a signal source 199. For example, the signal source 199 may be an RF (Radio Frequency) module for exciting the first antenna element 121. In some embodiments, the first radiation element 130 is a variable-width structure, and includes a wide portion 134 adjacent to the first end 131 and a narrow portion 135 adjacent to the second end 132. The narrow portion 135 is coupled through the wide portion 134 to the feeding point FP. It should be noted that the term “adjacent” or “close” over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

A stamping structure is formed by the feeding radiation element 140, the second radiation element 150, and the shorting radiation element 160 (or it may be called as an elevated structure). In other words, only a portion of the stamping structure directly touches the dielectric substrate 110, and the other portion of the stamping structure is separate from the dielectric substrate 110. In some embodiments, the aforementioned stamping structure has a vertical projection on the first surface E1 of the dielectric substrate 110. Such a vertical projection is inside the clearance region 118 and does not overlap the ground element 115 at all.

The feeding radiation element 140 may substantially have a tapered shape, which is adjacent to the first radiation element 130 but does not directly touch the first radiation element 130. Specifically, the feeding radiation element 140 has a first end 141 and a second end 142. The width of the second end 142 is much greater than that of the first end 141.

In some embodiments, the feeding radiation element 140 further includes a coupling portion 145 disposed on the first surface E1 of the dielectric substrate 110. The coupling portion 145 is positioned at the first end 141 of the feeding radiation element 140, and it may substantially have a rectangular shape or a square shape. The coupling portion 145 of the feeding radiation element 140 is adjacent to the wide portion 134 of the first radiation element 130. A coupling gap GC may be formed between the coupling portion 145 and the wide portion 134. That is, it is considered that an equivalent capacitor is formed between the feeding radiation element 140 and the first radiation element 130.

The second radiation element 150 may substantially have a straight-line shape. Specifically, the second radiation element 150 has a first end 151 and a second end 152. The first end 151 of the second radiation element 150 is coupled to the second end 142 of the feeding radiation element 140. The second end 152 of the second radiation element 150 is an open end. In some embodiments, the second radiation element 150 further includes a terminal bending portion 155, which is positioned at the second end 152 of the second radiation element 150 and extends toward the dielectric substrate 110. It should be understood that the terminal bending portion 155 is merely an optional component, which is removable in other embodiments.

The second radiation element 150 is coupled through the shorting radiation element 160 to the ground element 115. Specifically, the shorting radiation element 160 has a first end 161 and a second end 162. The first end 161 of the shorting radiation element 160 is coupled to the first end 151 of the second radiation element 150. The second end 162 of the shorting radiation element 160 is coupled to the ground element 115. In some embodiments, the shorting radiation element 160 includes a first support pillar 168, which is perpendicular to the first surface E1 of the dielectric substrate 110 and is configured to support the aforementioned stamping structure.

In some embodiments, the first antenna element 121 further includes a third radiation element 170, which may substantially have a relatively long L-shape. Specifically, the third radiation element 170 has a first end 171 and a second end 172. The first end 171 of the third radiation element 170 is coupled to the shorting radiation element 160. The second end 172 of the third radiation element 170 extends onto the first surface E1 of the dielectric substrate 110. In some embodiments, the third radiation element 170 includes a second support pillar 178, which is perpendicular to the first surface E1 of the dielectric substrate 110 and is configured to support the aforementioned stamping structure.

In some embodiments, the first antenna element 121 further includes a fourth radiation element 180, which may substantially have a straight-line shape. Specifically, the fourth radiation element 180 has a first end 181 and a second end 182. The first end 181 of the fourth radiation element 180 is coupled to the shorting radiation element 160. The second end 182 of the fourth radiation element 180 extends onto the first surface E1 of the dielectric substrate 110. In some embodiments, the fourth radiation element 180 includes a third support pillar 188, which is perpendicular to the first surface E1 of the dielectric substrate 110 and is configured to support the aforementioned stamping structure.

In some embodiments, the first antenna element 121 further includes a fifth radiation element 190, which may substantially have a relatively short L-shape. Specifically, the fifth radiation element 190 has a first end 191 and a second end 192. The first end 191 of the fifth radiation element 190 is coupled to the shorting radiation element 160. The second end 192 of the fifth radiation element 190 is an open end. In addition, the fifth radiation element 190 is at least partially surrounded by the third radiation element 170 and the fourth radiation element 180. It should be understood that the third radiation element 170, the fourth radiation element 180, and the fifth radiation element 190 may be disposed on the same plane. The third radiation element 170, the fourth radiation element 180, and the fifth radiation element 190 are all optional components, and they are removable in other embodiments.

In some embodiments, the antenna system 100 covers a first frequency band, a second frequency band, a third frequency band, a fourth frequency band, and a fifth frequency band. For example, the first frequency band may be from 615 MHz to 960 MHz, the second frequency band may be from 1700 MHz to 2200 MHz, the third frequency band may be from 2300 MHz to 2700 MHz, the fourth frequency band may be from 3300 MHz to 4200 MHz, and the fifth frequency band may be from 5100 MHz to 5900 MHz. Therefore, the antenna system 100 can support at least the wideband operations of the conventional LTE (Long Term Evolution) and the next 5G (5th Generation Mobile Network) communication.

In some embodiments, the operational principles of the antenna system 100 will be described as follows. The feeding radiation element 140, the second radiation element 150, and the shorting radiation element 160 can be excited by the first radiation element 130 using a coupling mechanism, so as to generate a fundamental resonant mode and form the aforementioned first frequency band. The wide portion 134 and the narrow portion 135 of the first radiation element 130 can be excited together to generate the aforementioned second frequency band. The feeding radiation element 140, the second radiation element 150, and the shorting radiation element 160 can be also excited to generate a higher-order resonant mode and form the aforementioned third frequency band and fourth frequency band. The wide portion 134 of the first radiation element 130 can be excited independently to generate the aforementioned fifth frequency band. According to practical measurements, the capacitive coupling feed of the feeding radiation element 140 can help to improve the isolation between the first antenna element 121 and the other adjacent antenna elements. In addition, if the third radiation element 170, the fourth radiation element 180, and the fifth radiation element 190 are applied to the first antenna element 121, the operational bandwidth of the aforementioned first frequency band will be further increased.

In some embodiments, the element sizes of the antenna system 100 will be described as follows. The length L1 of the wide portion 134 of the first radiation element 130 may be substantially equal to 0.25 wavelength ($\lambda/4$) of the fifth frequency band of the antenna system 100. The total length L2 of the wide portion 134 and the narrow portion 135 of the first radiation element 130 may be substantially equal to 0.25 wavelength ($\lambda/4$) of the second frequency band of the antenna system 100. In the first radiation element 130, the width W1 of the wide portion 134 may be from 10 mm to 20 mm, and the width W2 of the narrow portion 135 may be from 3 mm to 6 mm. The total length L3 of the second radiation element 150 and the shorting radiation element 160 may be shorter than or equal to 0.3 wavelength ($3\lambda/10$) of the first frequency band of the antenna system 100. In the feeding radiation element 140, the length L4 of the coupling portion 145 may be from 1 mm to 5 mm, and the width W4 of the coupling portion 145 may be from 1 mm to 5 mm. The height H1 of the aforementioned stamping structure on the first surface E1 of the dielectric substrate 110 may be from 10 mm to 25 mm. The width of the coupling gap GC (or the thickness of the dielectric substrate 110) may be from 0.1 mm to 3 mm. The distance D1 between the second radiation element 150 and the third radiation element 170 may be from 2 mm to 3 mm. The above ranges of element sizes and parameters are calculated and obtained according to many experiment results, and they help to optimize the isolation, the operational bandwidth, and the impedance matching of the antenna system 100.

Figure 2:
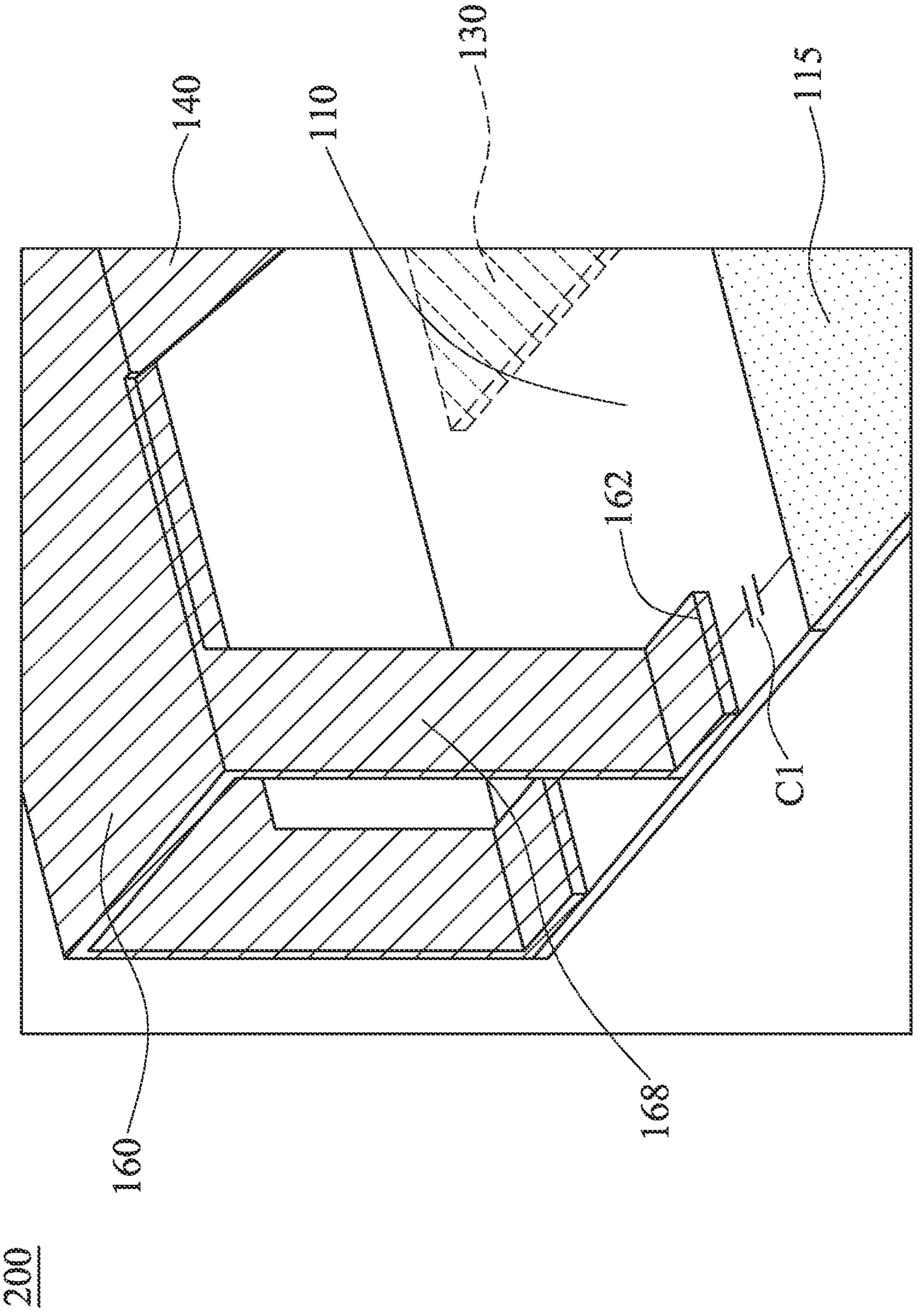
FIG. 2 is a partial front view of an antenna system according to an embodiment of the invention.

FIG. 2 is a partial front view of an antenna system 200 according to an embodiment of the invention. FIG. 2 is similar to FIG. 1A. In the embodiment of FIG. 2, the antenna system 200 further includes a capacitor C1, which may be a fixed capacitor or a variable capacitor. Specifically, the capacitor C1 has a first terminal coupled to the second end 162 of the shorting radiation element 160, and a second terminal coupled to the ground element 115. That is, the shorting radiation element 160 is further coupled through the capacitor C1 to the ground element 115. For example, the capacitance of the capacitor C1 may be from 2 pF to 15 pF, but it is not limited thereto. According to practical measurements, the capacitor C1 is configured as a high-pass filter, which can help to suppress the low-frequency coupling amount and to reduce the ECC (Envelope Correlation Coefficient) between the first antenna element 121 and the other adjacent antenna elements. Other features of the antenna system 200 of FIG. 2 are similar to those of the antenna system 100 of FIG. 1A, FIG. 1B and FIG. 1C. Accordingly, the two embodiments can achieve similar levels of performance.

Figure 3:
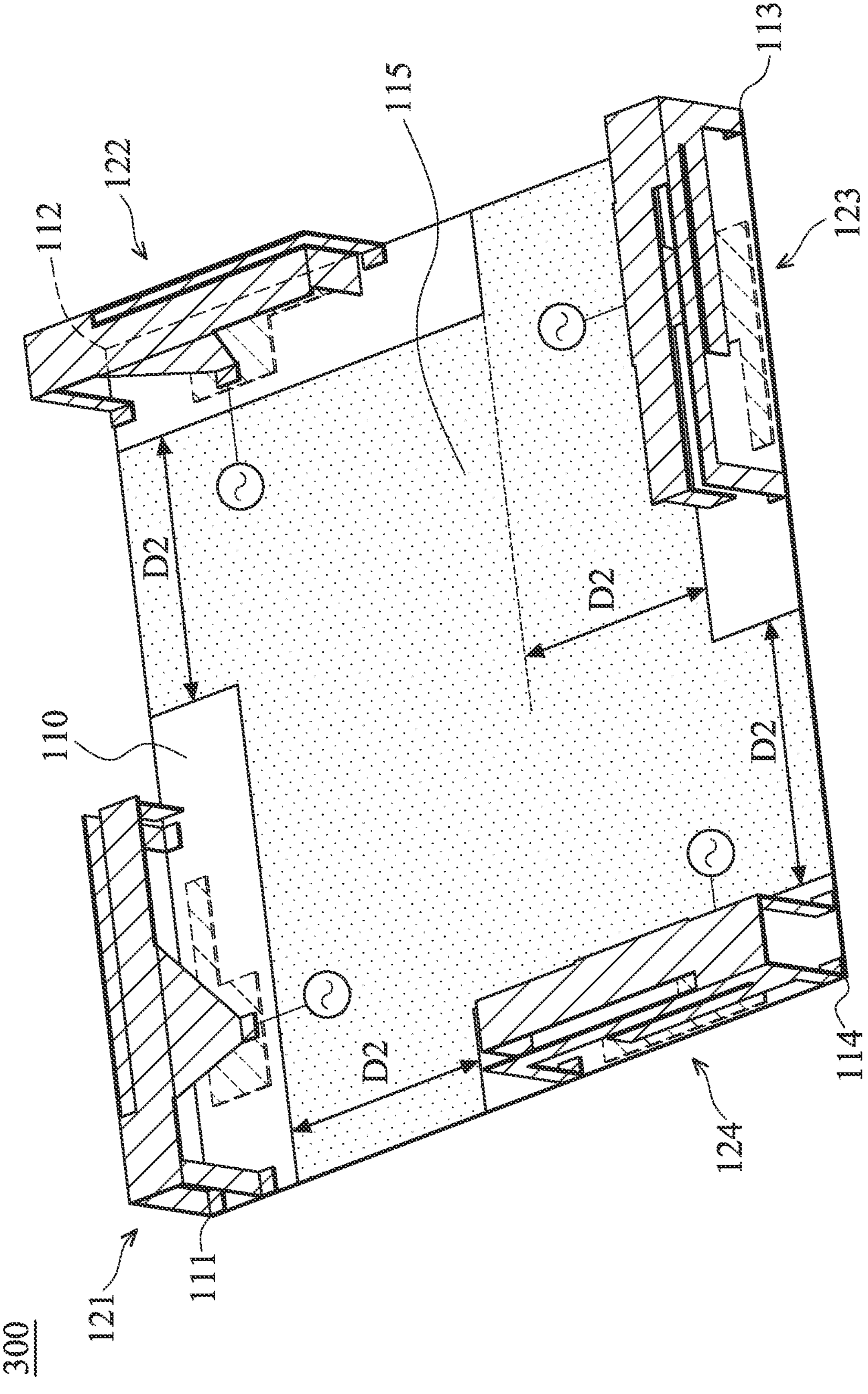
FIG. 3 is a perspective view of an antenna system according to an embodiment of the invention.

FIG. 3 is a perspective view of an antenna system 200 according to an embodiment of the invention. FIG. 3 is similar to FIG. 1A. In the embodiment of FIG. 3, besides the first antenna element 121, the antenna system 300 further includes one or more of a second antenna element 122, a third antenna element 123, and a fourth antenna element 124, so as to support MIMO (Multi-Input and Multi-Output) operations. For example, the first antenna element 121, the second antenna element 122, the third antenna element 123, and the fourth antenna element 124 may be positioned at four corners 111, 112, 113 and 114 of the dielectric substrate 110, respectively, but they are not limited thereto. It should be noted that each of the second antenna element 122, the third antenna element 123, and the fourth antenna element 124 has the same structure as that of first antenna element 121; however, it has a different arrange direction from that of the first antenna element 121. For example, any adjacent two of the first antenna element 121, the second antenna element 122, the third antenna element 123, and the fourth antenna element 124 may be substantially perpendicular to each other. In order to increase the isolation of the antenna system 300 and reduce the ECC between all of the antenna elements, the distance D2 between any adjacent two of the first antenna element 121, the second antenna element 122, the third antenna element 123, and the fourth antenna element 124 should be longer than or equal to 10 mm. In alternative embodiments, the antenna system 300 includes more or fewer antenna elements. Other features of the antenna system 300 of FIG. 3 are similar to those of the antenna system 100 of FIG. 1A, FIG. 1B and FIG. 1C. Accordingly, the two embodiments can achieve similar levels of performance.

The invention proposes a novel antenna system, which includes at least one hybrid antenna element. In comparison to the conventional design, the invention has at least the advantages of wide bandwidth, high isolation, and low ECC. Therefore, the invention is suitable for application in a variety of communication devices.

Note that the above element sizes, element shapes, and frequency ranges are not limitations of the invention. A designer can fine-tune these settings or values according to different requirements. It should be understood that the antenna system of the invention is not limited to the configurations of FIGS. 1-3. The invention may merely include any one or more features of any one or more embodiments of FIGS. 1-3. In other words, not all of the features displayed in the figures should be implemented in the antenna system of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:
- a dielectric substrate, having a first surface and a second surface opposite to each other;
- a ground element, disposed on the first surface of the dielectric substrate; and
- a first antenna element, comprising:
- a first radiation element, having a feeding point, and disposed on the second surface of the dielectric substrate;
- a feeding radiation element, disposed adjacent to the first radiation element;
- a second radiation element, coupled to the feeding radiation element; and
- a shorting radiation element, wherein the second radiation element is further coupled through the shorting radiation element to the ground element;
- wherein the first radiation element comprises a wide portion and a narrow portion, and the narrow portion is coupled through the wide portion to the feeding point.

2. The antenna system as claimed in claim 1, wherein the antenna system covers a first frequency band, a second frequency band, a third frequency band, a fourth frequency band, and a fifth frequency band.

3. The antenna system as claimed in claim 2, wherein the first frequency band is from 615 MHz to 960 MHz, the second frequency band is from 1700 MHz to 2200 MHz, the third frequency band is from 2300 MHz to 2700 MHZ, the fourth frequency band is from 3300 MHz to 4200 MHz, and the fifth frequency band is from 5100 MHz to 5900 MHz.

4. The antenna system as claimed in claim 2, wherein a total length of the wide portion and the narrow portion of the first radiation element is substantially equal to 0.25 wavelength of the second frequency band.

5. The antenna system as claimed in claim 2, wherein a length of the wide portion of the first radiation element is substantially equal to 0.25 wavelength of the fifth frequency band.

6. The antenna system as claimed in claim 2, wherein the feeding radiation element further comprises a coupling portion disposed on the first surface of the dielectric substrate, and the coupling portion is adjacent to the wide portion of the first radiation element.

7. The antenna system as claimed in claim 2, wherein a total length of the second radiation element and the shorting radiation element is shorter than or equal to 0.3 wavelength of the first frequency band.

8. The antenna system as claimed in claim 1, wherein the first radiation element substantially has an L-shape.

9. The antenna system as claimed in claim 1, wherein the feeding radiation element substantially has a tapered shape.

10. The antenna system as claimed in claim 1, wherein a stamping structure is formed by the feeding radiation element, the second radiation element, and the shorting radiation element.

11. The antenna system as claimed in claim 10, wherein a height of the stamping structure on the first surface of the dielectric substrate is from 10 mm to 25 mm.

12. The antenna system as claimed in claim 1, further comprising:
- a capacitor, wherein the shorting radiation element is further coupled through the capacitor to the ground element.

13. The antenna system as claimed in claim 1, wherein the first antenna element further comprises:
- a third radiation element, coupled to the shorting radiation element;
- a fourth radiation element, coupled to the shorting radiation element; and
- a fifth radiation element, coupled to the shorting radiation element, wherein the fifth radiation element is at least partially surrounded by the third radiation element and the fourth radiation element.

14. The antenna system as claimed in claim 1, further comprising:
- a second antenna element, wherein the second antenna element and the first antenna element have same structures and different arrangement directions.

15. The antenna system as claimed in claim 14, further comprising:
- a third antenna element, wherein the third antenna element and the first antenna element have same structures and different arrangement directions.

16. The antenna system as claimed in claim 15, further comprising:
- a fourth antenna element, wherein the fourth antenna element and the first antenna element have same structures and different arrangement directions.

17. The antenna system as claimed in claim 16, wherein the first antenna element, the second antenna element, the third antenna element, and the fourth antenna element are positioned at a plurality of corners of the dielectric substrate, respectively.

18. The antenna system as claimed in claim 16, wherein any adjacent two of the first antenna element, the second antenna element, the third antenna element, and the fourth antenna element are substantially perpendicular to each other.

19. The antenna system as claimed in claim 16, wherein a distance between any adjacent two of the first antenna element, the second antenna element, the third antenna element, and the fourth antenna element is longer than or equal to 10 mm.

* * * * *